Patented Nov. 18, 1952

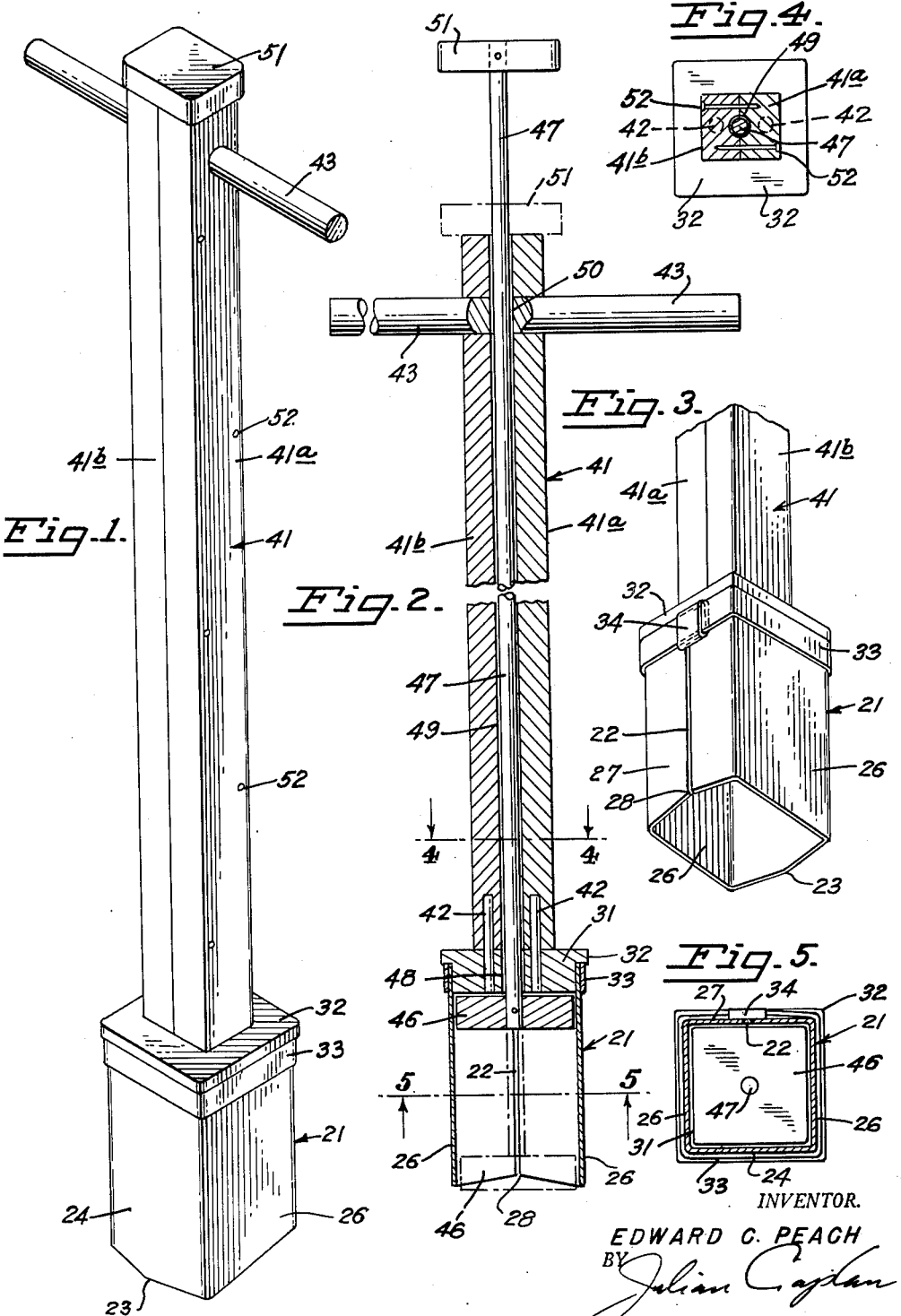

2,618,500

UNITED STATES PATENT OFFICE 2,618,500

GARDEN IMPLEMENT

Edward C. Peach, San Francisco, Calif.

Application March 14, 1949, Serial No. 81,265

2 Claims. (Cl. 294—50.7)

This invention relates to new and useful improvements in garden implement, particularly suitable for digging and aerating the soil.

One of the objects of the invention is to provide a garden tool which may be used to dig holes in earth and thus has particular utility in preparing holes for planting and in similar tasks for which conventional trowels and shovels are now employed. It has particular advantage in that the gardener need not bend, kneel or stoop in using this implement.

Another object of the invention is the accurate positioning of the holes which is facilitated by use of the implement, which is of particular importance when it is desired to arrange plants in regular rows.

A further object of the invention is the discharge of the earth which has been removed by the implement into a neat pile by means of a scraper or expeller which forces a core of earth out of the implement at the manual control of the operator.

Still other objects of the invention are its simplicity, absence of parts to get out of adjustment, ease of manufacture and assembly, and low cost.

With the above and other objects and advantages in view, the invention consists in the matters hereinafter set forth and more particularly pointed out in the appended claims, reference being had therein to the accompanying drawings, in which:

Fig. 1 is a perspective of the implement;

Fig. 2 is a vertical section;

Fig. 3 is a perspective of the lower portion of the implement;

Fig. 4 is a section taken on the line 4—4 of Fig. 2; and

Fig. 5 is a section taken along the line 5—5 of Fig. 2.

The blade 21 of the garden tool which is the subject of this invention is formed of medium gauge sheet metal so that it has considerable resistance to bending or deformation as it is forced into the earth. In the preferred embodiment of the invention illustrated herein the blade is bent or folded so that its shape in cross-section is that of a hollow square, the vertical edges being separated by a gap of about one-eighth inch along line 22 as best shown in Fig. 5. The cutting edge of the blade is tapered to an obtuse point 23 at one side 24 of the square to facilitate digging. The adjoining sides 26 slant downwardly from the corners at which they join the side 24. The edge of the fourth side 27 is relieved at a somewhat greater angle than sides 26, and the edge thus presents an inverted point 28 at or about the line 22. Hence the blade acts in the manner of a pointed spade and facilitates digging the soil.

Earth cut by the implement tends to become impacted inside the blade in a square core, and hence if the blade is removed from the hole the core is removed with it and may be transferred to any desired location. It will be understood that the shape of the blade is subject to considerable modification in that a cross-section other than a square may be used and it is not necessary that the edges actually meet at line 22, but it is preferred that the edges be close enough together so that the core-removing function of the blade be maintained. The configuration of the cutting edge of the blade is subject to considerable modification also, but the form illustrated in the accompanying drawings is particularly desirable in that a good cutting action is obtained and the blade slices into the soil with a minimum of effort.

The upper edge of the shell of the hollow blade 21 is substantially closed off by a plug 31 of a cross-section such that it fits within the hollow of the blade, and the plug is provided with a circumferential shoulder 32 to provide a stop for the upper edge of the blade. Various means of attachment of the blade to the plug may be used, but the preferred embodiment includes the use of a piece of strap iron 33 encircling the blade and holding the blade in tight engagement with the plug. The ends of strap 33 are joined and held by a conventional strap fastener 34. It will be understood that screws or other means might, if desired, be substituted for the strap 33 or supplement it, but it has been found that this means of attachment is particularly rapidly performed, durable and effective.

A handle 41 of suitable length is attached to the plug 32 by dowels 42, screws or other suitable means and adjacent the upper end thereof are hand grips 43 extending through the handle and projecting from opposite sides thereof.

In order to expel the core of earth from within the hollow blade 21, an expeller or plunger 46 is provided, slidable within the interior of the blade 21 and being slightly smaller in cross-section than the blade but generally conforming to the shape thereof. A rod 47 is attached to the expeller and runs through a hole 48 in plug 31, up through a hole 49 in the center of handle 41, through a hole 50 in member 43 and out through the top of the handle, terminating in a knob 51. Normally the expeller 46 is positioned so that it abuts the plug 31, but when it is desired to discharge earth from the implement, the operator depresses knob 51, thus causing the expeller 46 to push the core out of the blade 21 and assume the position shown in dash lines in Fig. 2. In the preferred embodiment illustrated herein the handle 41 is made of two longitudinally extending pieces 41a and 41b joined together as by means of nails 52 to form a composite handle of square cross-section, and the hole 49 through which the rod 47 slides is grooved out of the complementary adjoining portions of the handle. It will be understood that a one-piece handle might be used and a hole drilled down the center thereof. It is further apparent that the rod 47 might be eccentric of a solid handle, extending alongside thereof and being held in place by means of brackets.

In use, the gardener manipulates the handle 41 and hand grip 43 so as to move the blade 21 to cut a hole in the earth. If the handle 41 is depressed substantially vertically, a square hole may be cut. Since the soil tends to remain within the blade 21, it may be removed as a single core. The core may be expelled by depressing the knob 51 as has been described, the blade 21 spreading outwardly slightly away from the gap at line 22 so as to assist in discharging the core. Top-soil and sub-soil may be conveniently segregated by pushing the blade into the earth a proper distance and removing only top-soil in the first bite and then removing sub-soil in the second bite and expelling it in a different location. If a regular, straight-sided hole is not desired, the point 23 of the blade may be used to dig out whatever configuration is preferred.

The tool is also useful in aerating the soil by cutting into the top crust or sod so as to permit air to reach the lower strata.

It is understood that whereas a preferred embodiment of the invention has been described and illustrated, changes may be made therein without departing from the spirit of the invention and the scope of the appended claims.

What is claimed is:

1. A garden implement comprising, a blade adapted to cut a core of earth, said blade being a hollow square in cross-section with a gap extending longitudinally along said blade and having a lower cutting edge, said edge comprising an obtuse point substantially midway of one side of said square, the sides adjacent said first side being relieved at substantially the same angle as said first side and merging therewith, and a fourth side relieved at a sharper angle than the other sides and having an inverted point substantially central thereof, a plug closing off the upper end of said blade and fitted therewithin, a shoulder on said plug and constituting an abutment limiting upward movement of said blade, a strap encircling said blade and said plug and attaching said plug and blade together, said strap also abutting said shoulder, a handle attached to said plug, an expeller slidable within said blade to a position substantially to said lower cutting edge, a rod fixed to said expeller and extending upward through holes in said plug and handle, and a knob on the upper end of said rod and external of said handle manually operable to move said expeller relative to said blade.

2. A garden implement for forming regularly shaped holes in soil preparatory to transplanting, comprising, a thin, elongated blade having a cutting edge at one end and being hollow in cross-section, with a gap extending longitudinally along said blade to provide access for air into and from the interior of said blade, a plug closing off the end of said blade opposite said cutting edge, a strap around the exterior of said blade overlying said plug and securing said plug and blade together, a shoulder on said plug forming an abutment limiting upward movement of said blade relative to said plug, a handle on said plug, an expeller loosely slidable within said hollow blade and conforming in shape thereto, said expeller being slidable downwardly substantially to said cutting edge of said blade, and means for sliding said expeller relative to said blade.

EDWARD C. PEACH.

REFERENCES CITED

The following references are of record in the file of this patent:

UNITED STATES PATENTS

| Number | Name | Date |
|---|---|---|
| 220,251 | Needham | Oct. 7, 1879 |
| 370,810 | Newman | Oct. 4, 1887 |
| 849,957 | Zwiebel | Apr. 9, 1907 |
| 1,134,618 | Kaufman | Apr. 6, 1915 |
| 1,692,436 | Deane | Nov. 20, 1928 |
| 1,783,026 | Ober | Nov. 25, 1930 |

FOREIGN PATENTS

| Number | Country | Date |
|---|---|---|
| 75,910 | Norway | Nov. 22, 1932 |